US012166560B2

(12) United States Patent
Sun et al.

(10) Patent No.: US 12,166,560 B2
(45) Date of Patent: Dec. 10, 2024

(54) HIGH SPEED SINGLE FREQUENCY NETWORK BEAM FAILURE RECOVERY

(71) Applicant: Apple Inc., Cupertino, CA (US)

(72) Inventors: Haitong Sun, Cupertino, CA (US); Dawei Zhang, Saratoga, CA (US); Wei Zeng, San Diego, CA (US); Yushu Zhang, Beijing (CN); Hong He, Cupertino, CA (US); Chunxuan Ye, San Diego, CA (US); Huaning Niu, Beijing (CN); Seyed Ali Akbar Fakoorian, San Diego, CA (US); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 17/917,878

(22) PCT Filed: Nov. 4, 2021

(86) PCT No.: PCT/CN2021/128559
§ 371 (c)(1),
(2) Date: Oct. 7, 2022

(87) PCT Pub. No.: WO2023/077337
PCT Pub. Date: May 11, 2023

(65) Prior Publication Data
US 2023/0283353 A1    Sep. 7, 2023

(51) Int. Cl.
*H04B 7/06* (2006.01)
*H04W 76/15* (2018.01)
*H04W 76/18* (2018.01)

(52) U.S. Cl.
CPC ........ *H04B 7/06964* (2023.05); *H04W 76/15* (2018.02); *H04W 76/18* (2018.02)

(58) Field of Classification Search
CPC ... H04B 7/06964; H04B 7/024; H04W 76/15; H04W 76/18; H04W 72/21
(Continued)

(56) References Cited

U.S. PATENT DOCUMENTS

2019/0281574 A1*  9/2019  Reial .................. G01S 5/10
2020/0374960 A1   11/2020  Deenoo
(Continued)

FOREIGN PATENT DOCUMENTS

| CN | 110915283 | 3/2020 |
| CN | 112352387 | 3/2020 |

(Continued)

OTHER PUBLICATIONS

International Search Report and Written Opinion for PCT Patent Application No. PCT/CN2021/128559; 10 pages; Jul. 29, 2022.
(Continued)

*Primary Examiner* — Emmanuel Bayard
(74) *Attorney, Agent, or Firm* — Kowert, Hood, Munyon, Rankin & Goetzel, P.C.

(57) ABSTRACT

This disclosure relates to techniques for performing beam failure recovery in a high speed single frequency network scenario in a wireless communication system. A wireless device may establish a cellular link with a cellular network according to a single frequency network scheme. The wireless device may determine one or more beam failure detection resources for each of multiple transmission reception points associated with the cellular network. The wireless device may detect beam failure for one or more of the transmission reception points using the beam failure detection resources.

20 Claims, 4 Drawing Sheets

(58) Field of Classification Search
USPC .................................................. 375/262, 267
See application file for complete search history.

(56) References Cited

U.S. PATENT DOCUMENTS

| | | | |
|---|---|---|---|
| 2021/0044342 A1* | 2/2021 | He | H04W 72/046 |
| 2021/0058997 A1 | 2/2021 | Zhang | |
| 2021/0351834 A1* | 11/2021 | Yang | H04W 72/0466 |
| 2022/0103225 A1* | 3/2022 | Ling | H04B 7/0695 |
| 2022/0232614 A1* | 7/2022 | Gao | H04W 72/23 |
| 2023/0121938 A1* | 4/2023 | Zhou | H04W 72/23 |
| | | | 375/347 |
| 2023/0163914 A1* | 5/2023 | Koskela | H04W 24/08 |
| | | | 370/242 |
| 2023/0171763 A1* | 6/2023 | Gao | H04W 52/58 |
| | | | 370/329 |
| 2023/0209634 A1* | 6/2023 | Koskela | H04B 7/0695 |
| | | | 370/217 |

FOREIGN PATENT DOCUMENTS

| | | |
|---|---|---|
| GB | 2575691 | 1/2020 |
| WO | 2021025827 | 2/2021 |
| WO | 2021115204 | 6/2021 |
| WO | 2021159462 | 8/2021 |
| WO | 2021167528 | 8/2021 |

OTHER PUBLICATIONS

Extended European Search Report for EP Patent Application No. 21962855.9; Oct. 11, 2024.
Lenovo et al. "Enhancements for HST-SFN deployment"; 3GPP TSG RAN WG1 #105-e R1-2105761; May 10, 2021.

* cited by examiner

HIGH SPEED SINGLE FREQUENCY NETWORK BEAM FAILURE RECOVERY

PRIORITY CLAIM

This application is a national phase entry of PCT application number PCT/CN2021/128559, entitled "High Speed Single Frequency Network Beam Failure Recovery," filed Nov. 4, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for performing beam failure recovery in a high speed single frequency network scenario in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for performing beam failure recovery in a high speed single frequency network scenario in a wireless communication system.

According to the techniques described herein, it may be possible for a wireless device to make use of any or all of beam failure detection resources associated with multiple transmission reception points, candidate beam detection resources associated with multiple transmission reception points, and beam failure recovery scheduling requests associated with multiple transmission reception points.

Such beam failure recovery related resources for multiple transmission reception points may be configured for a wireless device explicitly or implicitly by a cellular network. Further, use of such resources can be performed in conjunction with multiple types of single frequency network schemes configured for use at high speeds (such as in a high speed train scenario), potentially including in a scenario in which the wireless device is responsible for estimating Doppler shift from each transmission reception point to improve channel estimation, and in a scenario in which the network pre-compensates for the Doppler shift for the wireless device.

The techniques described herein may potentially increase the reliability and robustness of beam failure recovery operations, at least according to some embodiments. For example, these techniques may increase the granularity with which beam failure detection can occur and be reported in high speed single frequency network scenarios, which may in turn reduce the amount of time to perform beam failure recovery, at least in some instances.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
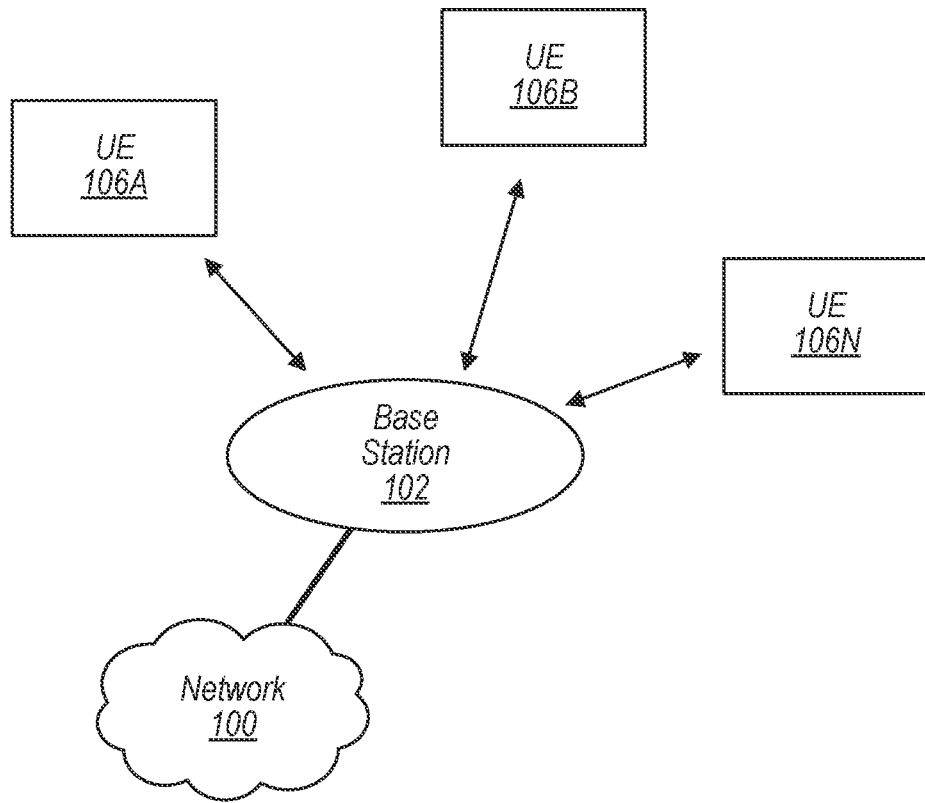
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
  UE: User Equipment
  RF: Radio Frequency
  BS: Base Station
  GSM: Global System for Mobile Communication
  UMTS: Universal Mobile Telecommunication System
  LTE: Long Term Evolution
  NR: New Radio
  TX: Transmission/Transmit
  RX: Reception/Receive
  RAT: Radio Access Technology
  TRP: Transmission-Reception-Point
  BFD: Beam Failure Detection
  CBD: Candidate Beam Detection
  BFR: Beam Failure Recovery
  DCI: Downlink Control Information
  CORESET: Control Resource Set
  QCL: Quasi-Co-Located or Quasi-Co-Location
  CSI: Channel State Information
  CSI-RS: Channel State Information Reference Signals
  SSB: Synchronization Signal Block Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)— The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
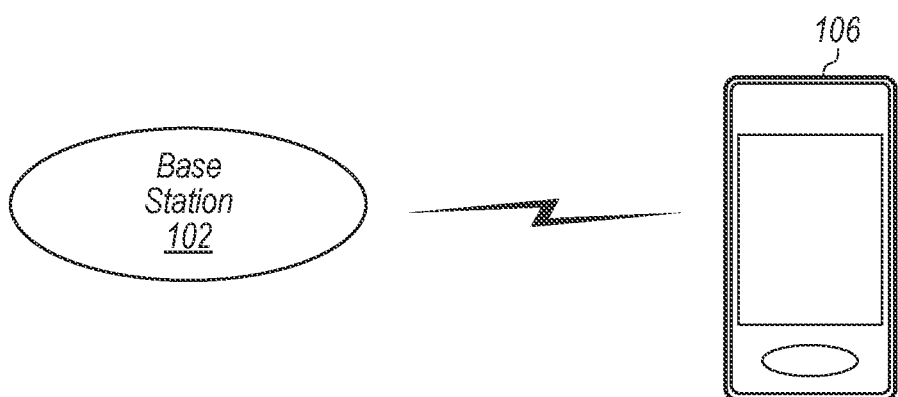
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform beam failure recovery in a high speed single frequency network scenario in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
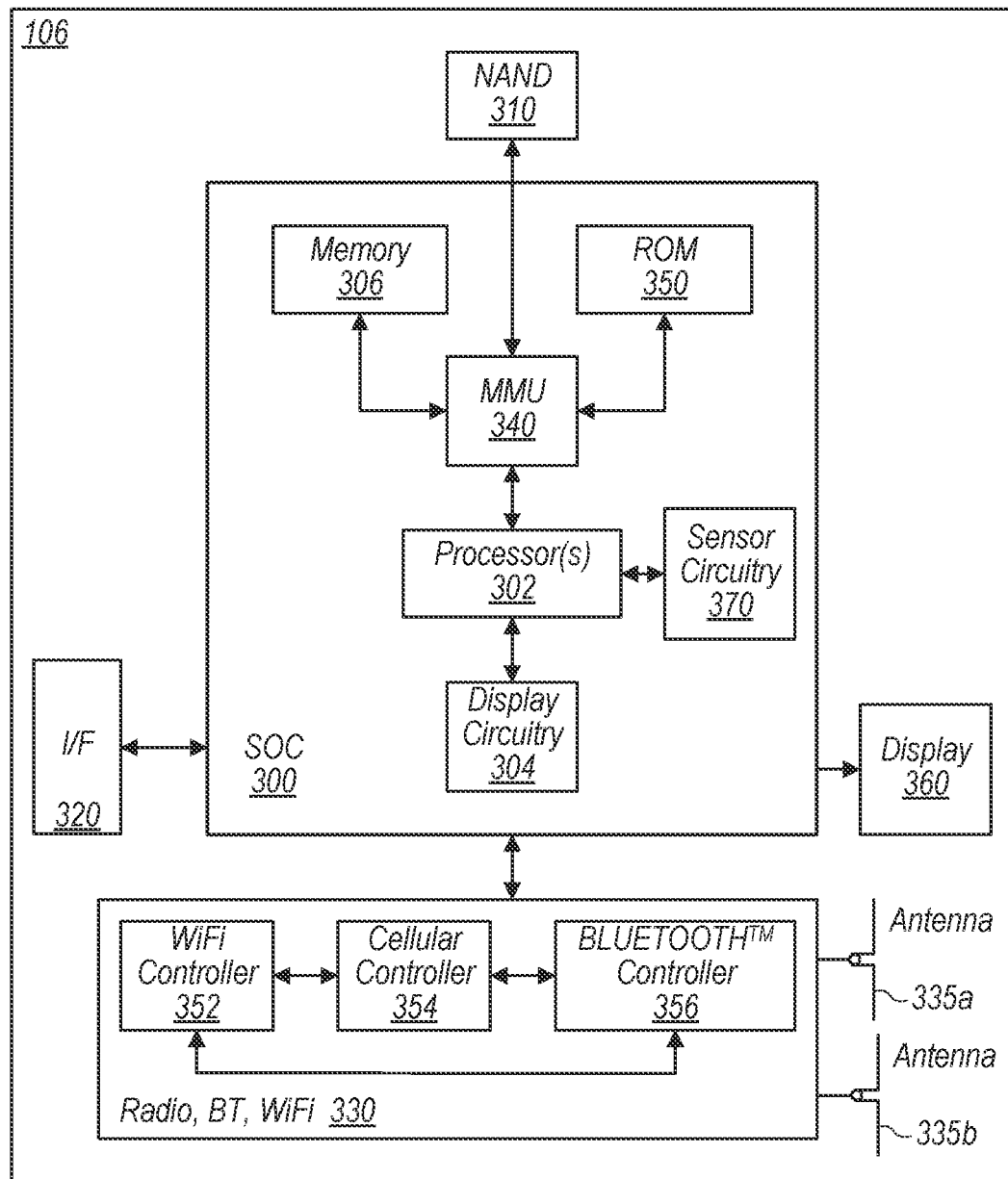
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform beam failure recovery in a high speed single frequency network scenario in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform beam failure recovery in a high speed single frequency network scenario in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
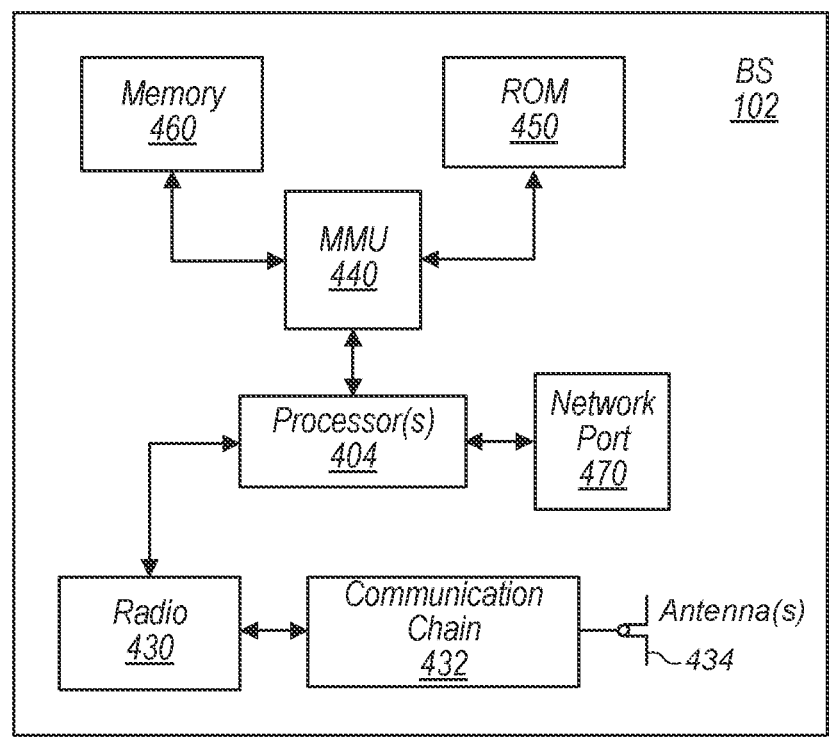
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Reference Signals

A wireless device, such as a user equipment, may be configured to perform a variety of tasks that include the use of reference signals (RS) provided by one or more cellular base stations. For example, initial access and beam measurement by a wireless device may be performed based at least in part on synchronization signal blocks (SSBs) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication system, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3GPP NR cellular communication standard, the channel state information fed back from the UE based on CSI-RS for CSI acquisition may include one or more of a channel quality indicator (CQI), a precoding matrix indicator (PMI), a rank indicator (RI), a CSI-RS Resource indicator (CRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
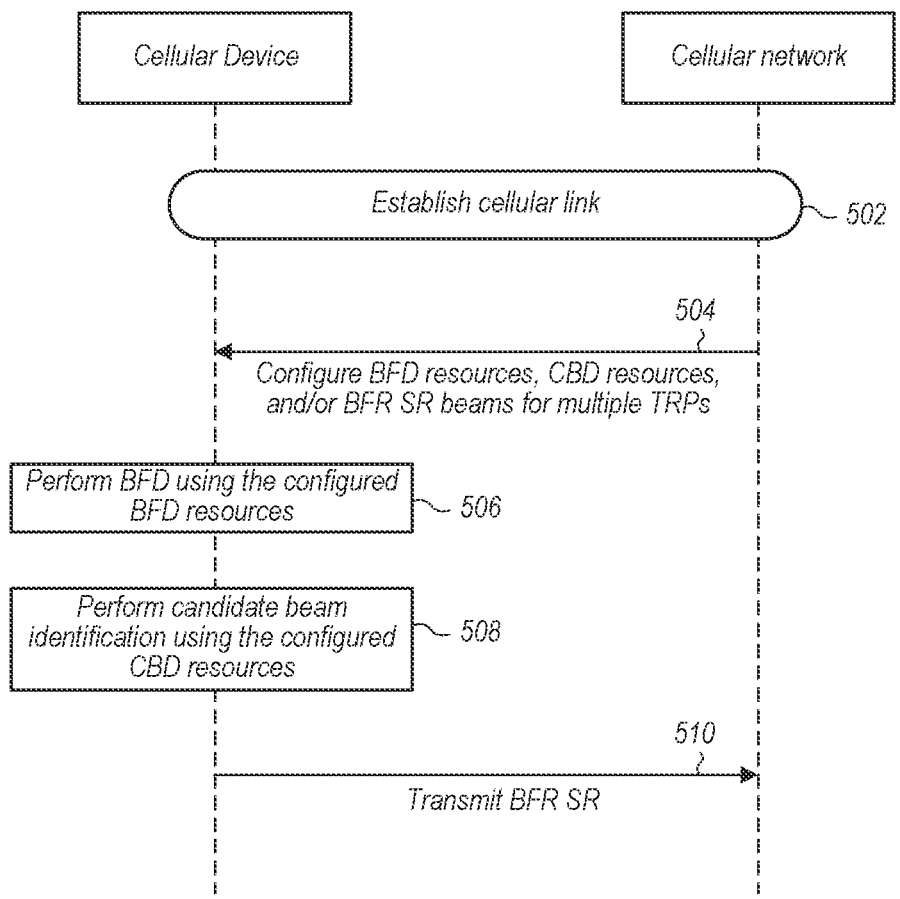
FIG. 5 is a flowchart diagram illustrating aspects of an exemplary possible method for performing beam failure recovery in a high speed single frequency network scenario in a wireless communication system, according to some embodiments.

FIG. 5—Beam Failure Recovery in a High Speed Single Frequency Network Scenario As wireless device capabilities increase, it may be useful to provide techniques that can make use of those increased wireless device capabilities, for example to improve the reliability of wireless communications, to reduce the latency of wireless communications, to increase the amount of data that can be communicated, and/or for any of various other possible reasons.

One wireless device capability that may be beneficial to make use of when performing wireless communications may include the ability to use multiple beams for transmitting and/or receiving, either concurrently/simultaneously or at different times, for example to increase the amount of data that can be transmitted and/or to improve the reliability of wireless communications by providing repetitions of communicated data or signaling with beam diversity.

One scenario in which multiple beams may be used could include a high speed single frequency network scenario. Such a deployment scenario could be used along a high speed train rail network, as one possibility, or potentially along other transportation corridors such as an express motorway, among various possibilities. In such a scenario, transmission reception points (TRPs) may be deployed along the transportation corridor, such that wireless devices travelling along the corridor may commonly be between a TRP towards which the wireless device is travelling and a TRP from which the wireless device is travelling away. A wireless device that is configured to communicate with such a set of TRPs may observe very high positive Doppler Shift from one TRP, and very high negative Doppler shift from the other TRP.

If the network is deployed as a single frequency network (e.g., at least for some portion of network operation), this can have a significant impact on the composite channel, for example such that it can vary relatively quickly (e.g., close to or more than 2 kHz, as one possibility). In order to account for this effect, there may be multiple possible high speed single frequency network schemes that can be deployed. One such possible scheme could include a scheme in which wireless devices estimate the Doppler shift from each TRP in the high speed single frequency network scenario, and use the estimated Doppler shift to improve the channel estimation. Another such possible scheme could include a scheme in which the cellular network can determine the Doppler shift between the TRPs and the wireless device and pre-compensate for the Doppler shift.

Note that there may be multiple possible ways for a wireless device to determine that it is in a high speed scenario, potentially including a high speed single frequency network scenario. For example, the cellular network may provide system information (e.g., in system information broadcast by cells providing the high speed single frequency network coverage) to indicate to a wireless device when it is in a high speed single frequency network scenario. For example, cells deployed along a network of high speed train (HST) cells may provide a "HighSpeedFlag" parameter indicating that they are part of such a deployment. Additionally, or alternatively, a wireless device may make use of movement speed or velocity estimations performed by the wireless device to determine if it is in a high speed scenario. For example, in some instances, a wireless device may be able to determine its velocity from one or more of a GPS unit, a cell frequency offset, and/or motion sensing circuitry of the wireless device.

Because of the potentially relatively high and differing Doppler shifts for the multiple TRPs in which a wireless device may be in communication in such scenario, it may be valuable to provide improved techniques for beam failure recovery in a high speed single frequency network scenario, at least according to some embodiments. For example, techniques that make use of multiple beam failure detection resources, candidate beam detection resources, and/or beam failure recovery scheduling requests associated with the different TRPs with which a wireless device is in communication could be introduced to potentially improve communication reliability and/or provide other possible benefits, at least according to some embodiments.

Accordingly, various techniques for performing beam failure recovery in a high speed single frequency network scenario are described herein, at least in some instances. To illustrate such possible techniques, FIG. 5 is a signal flow diagram illustrating methods for performing beam failure recovery with improved reliability in a high speed single frequency network scenario in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a cellular link with a cellular network. The cellular link may operate according to a single frequency network (SFN) scheme. In some instances, the SFN scheme may more particularly be a high speed train (HST) SFN scheme, which may be used to provide service to wireless devices travelling in high speed trains. According to some embodiments, the cellular link may operate according to 5G NR. For example, the wireless device may establish a session with an AMF entity of the cellular network by way of one or more gNBs that provide radio access to the cellular network. As another possibility, the cellular link may operate according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 504, the cellular network (e.g., a cellular base station configured to provide one or more TRPs in the cellular network) may configure the wireless device with beam failure detection resources (BFD) for each of multiple TRPs, candidate beam detection (CBD) resources for each of multiple TRPs, and/or beams associated with each of multiple TRPs to use to transmit beam failure recovery scheduling requests.

The beam failure detection resources may be configured explicitly or implicitly. In the case of explicit indication, as one possibility, RRC signaling indicating beam failure detection resources may include an independent set of BFD resources for each TRP in operation. At least in some instances, such beam failure resource configuration may be performed in such a way that the BFD resource sets do not (e.g., cannot, according to 3GPP specifications, as one possibility) share the same resources (e.g., including all along the quasi-co-location (QCL) chain, such that no resource in the BFD resource sets for different TRPs directly or indirectly share the same QCL typeD source, at least in some instances). As another possible constraint or configuration choice, it may be the case that the BFD resource sets for different TRPs have the same number of resources. In some instances, the resources configured as BFD resources when independent BFD resource sets are used may include channel state information reference signal (CSI-RS) resources and may not include synchronization signal block (SSB) resources.

Another explicit indication mechanism could include the cellular network configuring a beam failure detection resource set that includes resource pairs where one resource in a given resource pair is associated with one TRP and another resource in the given resource pair is associated with another TRP. Note that it may be possible for such a BFD resource set to include both individual BFD resources (e.g., configured for single-TRP BFD operation) and paired BFD resources (e.g., configured for multi-TRP BFD operation).

As previously noted herein, it may be possible that multiple high speed single frequency network schemes can be used. Accordingly, it may also be possible that an explicit or implicit indication of the type of high speed single frequency network scheme in use is provided to the wireless device, at least for the BFR operation. As one example, it may be possible that RRC signaling is used to explicitly configure the high speed single frequency network scheme in use. As another example, when independent BFD resource sets are configured, to differentiate between a high speed single frequency network scheme without pre-compensation and between a high speed single frequency network scheme with pre-compensation, the QCL configuration may be used to imply the scheme in use. In such a scenario, to identify a scheme without pre-compensation, resources in both BFD resource sets may be configured to be QCL'd to tracking reference signal (TRS) with QCL typeA, and QCL typeD if applicable. To identify a scheme with pre-compensation, resources in one BFD resource set may be configured to be QCL'd to TRS with QCL typeA, and QCL typeD if applicable, while resources in the other BFD resource set may be configured to be QCL'd to TRS with {average delay, delay spread}, and QCL typeD if applicable. Similarly in a scenario in which a BFD resource set is configured with paired detection resources, in a scheme without pre-compensation, both resources in a pair of BFD resources may be configured to be QCL'd to TRS with QCL typeA, and QCL typeD if applicable, while in a scheme with pre-compensation, one detection resource in a pair of detection resources may be configured to be QCL'd to TRS with QCL typeA, and QCL typeD if applicable, while the other detection resource in the pair of detection resources may be configured to be QCL'd to TRS with {average delay, delay spread}, and QCL typeD if applicable.

In the case of implicit configuration of BFD resources, control resource set (CORESET) resources may be monitored as the BFD resources, with selection of the CORESET resources to be used as BFD resources performed according to selection rules known to both the wireless device and the cellular network, e.g., such that the CORESET resources will be selected by the wireless device as BFD resources in a deterministic manner of which the cellular network is aware. For example, the criteria or rules that the wireless device is configured to follow to select the CORESETs to use for BFD resources could include any or all of the monitoring periodicity of the associated search space sets for each configured CORESET (e.g., such that CORESETs with more frequency monitoring periodicity are more likely to be selected), CORESET index for each configured CORESET (e.g., such that the CORESET with lowest index, or highest index if desired, is more likely to be selected), whether each configured CORESET is configured with one or two transmission configuration indicator (TCI) states (e.g., such that CORESETs configured with two TCI states are more likely to be selected for a multi-TRP operation scenario), among various possibilities. Alternatively, which CORESET(s) that the wireless device chooses to monitor for BFD may be left to wireless device implementation, potentially with all configured CORESETs being considered for the total number of BFD resources that the wireless device is expected to track.

Similar techniques may be used for CBD resource configuration as for BFD resource configuration, at least according to some embodiments. For example, the CBD resources may also be configured explicitly or implicitly. In the case of explicit indication, as one possibility, RRC signaling indicating CBD resources may include an independent set of CBD resources for each TRP in operation. At least in some instances, such CBD configuration may be performed in such a way that the CBD resource sets do not (e.g., cannot, according to 3GPP specifications, as one possibility) share the same resources. As another possible constraint or configuration choice, it may be the case that the CBD resource sets for different TRPs have the same number of resources. In some instances, the resources configured as CBD resources when independent CBD resource sets are used may include channel state information reference signal (CSI-RS) resources and may not include synchronization signal block (SSB) resources.

Another explicit indication mechanism could include the cellular network configuring a CBD resource set that includes resource pairs where one resource in a given resource pair is associated with one TRP and another resource in the given resource pair is associated with another TRP. Note that it may be possible for such a CBD resource set to include both individual CBD resources (e.g., configured for single-TRP CBD operation) and paired CBD resources (e.g., configured for multi-TRP CBD operation).

It may also be possible that an explicit or implicit indication of the type of high speed single frequency network scheme in use is provided to the wireless device, possibly specifically for the CBD operation. As one example, it may be possible that RRC signaling is used to explicitly configure the high speed single frequency network scheme in use. As another example, when independent CBD resource sets are configured, to differentiate between a high speed single frequency network scheme without pre-compensation and between a high speed single frequency network scheme with pre-compensation, the QCL configuration may be used to imply the scheme in use. In such a scenario, to identify a scheme without pre-compensation, resources in both CBD resource sets may be configured to be QCL'd to tracking reference signal (TRS) with QCL typeA, and QCL typeD if applicable. To identify a scheme with pre-compensation, resources in one CBD resource set may be configured to be QCL'd to TRS with QCL typeA, and QCL typeD if applicable, while resources in the other CBD resource set may be configured to be QCL'd to TRS with {average delay, delay spread}, and QCL typeD if applicable. Similarly in a scenario in which a CBD resource set is configured with paired detection resources, in a scheme without pre-compensation, both resources in a pair of CBD resources may be configured to be QCL'd to TRS with QCL typeA, and QCL typeD if applicable, while in a scheme with pre-compensation, one detection resource in a pair of detection resources may be configured to be QCL'd to TRS with QCL typeA, and QCL typeD if applicable, while the other detection resource in the pair of detection resources may be configured to be QCL'd to TRS with {average delay, delay spread}, and QCL typeD if applicable.

In the case of implicit configuration of CBD resources, it may be possible that random access channel (RACH) resources may be used as the CBD resources. Selection of the RACH resources to be used as CBD resources may be performed according to selection rules known to both the wireless device and the cellular network, or with selection of the RACH resources to be used as CBD resources left to wireless device implementation, according to various embodiments.

At least according to some embodiments, it may be possible that the number of explicitly or implicitly configured BFD resource sets and CBD resource sets are expected to match (e.g., if the configuration is to comply with 3GPP specifications). For example, in one possible scenario, valid configurations could include indication of one BFD resource set and 0 or 1 CBD resource set for single-TRP BFR operation, or indication of two BFD resource sets and 0 or 2 CBD resource sets for multi-TRP BFR operation in a high speed single frequency network configuration.

The cellular network may also provide one or more resources to the wireless device for use for transmitting a beam failure recovery (BFR) scheduling request (SR), in such a manner that the BFR SR can be transmitted to either or both of multiple TRPs in a high speed single frequency network scenario. This may include providing a single scheduling request identifier (SchedulingRequestId) for a wireless device for a given cell group, which includes a single physical uplink control channel (PUCCH) resource, where multiple spatial relations (e.g., beams) can be configured for the PUCCH resource. The spatial relations may be associated with different TRPs.

As another possibility, the cellular network may provide a single scheduling request identifier for a wireless device for a given cell group, which includes a multiple PUCCH resources, where a (potentially different) spatial relation can be configured for each PUCCH resource. The PUCCH resources may be associated with different TRPs.

As a still further possibility, the cellular network may provide multiple scheduling request identifiers for a wireless device for a given cell group, each of which may include a single PUCCH resources, where a (potentially different) spatial relation can be configured for the PUCCH resource for each scheduling request identifier. The scheduling request identifiers may be associated with different TRPs.

In 506, the wireless device may perform beam failure detection using the configured BFD resources for the multiple TRPs. The beam failure detection may include monitoring the configured BFD resources to determine a hypothetical physical downlink control channel (PDCCH) block error rate (BLER), according to some embodiments. For example, by comparing a known reference signal for a configured BFD resource to the actual received signal, the wireless device may be able to determine an approximate percentage of PDCCH transmissions that the wireless device would be unable to successfully receive and decode, were the PDCCH transmissions to occur using the transmission configuration of the BFD resource. If the hypothetical PDCCH BLER is greater than a configured threshold (e.g., 10%, as one possibility; other values are also possible) for a given BFD resource, the wireless device may determine that beam failure has occurred for the beam associated with that BFD resource.

In 508, the wireless device may perform candidate beam identification using the configured CBD resources for the multiple TRPs. The candidate beam identification may be performed based on determining that beam failure has occurred. The CBD resource(s) used to perform candidate beam identification may include resources associated with the same TRP(s) that the BFD resource(s) triggering the beam failure detection are associated with, at least according to some embodiments. Thus, if only one TRP is experiencing beam failure, it may be the case that the wireless device performs candidate beam identification using the CBD resource(s) associated with that TRP. If multiple TRPs are experiencing beam failure it may be the case that the wireless device performs candidate beam identification using the CBD resource associated with all of those TRPs. The candidate beam identification may include determining a beam configuration that may be expected to meet they hypothetical PDCCH BLER requirements of the cellular network or a beam configuration that may provide received reference signal strength above a certain threshold, e.g., based on assessing actual signals received on the configured CBD resources in comparison with the reference signal known to have been transmitted on the configured CBD resources, at least according to some embodiments.

In 510, the wireless device may transmit a beam failure recovery scheduling request using one or more beams selected from the beams configured for use for transmitting beam failure recovery scheduling requests. The use of the selected beam(s) may result in the BFR SR being transmitted to a TRP (or multiple TRPs) associated with the selected beam. Note that it may be possible that if beam failure is detected for one TRP, the wireless device transmits a BFR SR to the other TRP, as it may increase the likelihood of successful reception of the BFR SR by the cellular network if the BFR SR is provided to a TRP that is not experiencing beam failure, and thus may also potentially increase the likelihood and/or reduce the amount of time needed for beam failure recovery. Thus, depending on the manner in which the BFR SRs for the multiple TRPs are configured, the wireless device may be configured to select which beam(s) or spatial relation(s) to use to transmit a BFR SR, or which PUCCH resource(s) to use to transmit a BFR SR, or which scheduling request identifiers to use to transmit a BFR SR, based at least in part on which BFD resources are associated with detection of beam failure.

Thus, at least according to some embodiments, the method of FIG. 5 may be used to perform beam failure recovery in a high speed single frequency network scenario, at least in some instances. As described herein, these techniques may improve beam failure recovery performance in scenarios in which a wireless device is in communication with multiple TRPs with significant and opposing Doppler shifts, at least according to some embodiments.

Additional Information

The following additional information is provided to illustrate further aspects that might be used in conjunction with the method of FIG. 5 if desired. It should be noted, however, that these additional exemplary details not intended to be limiting to the disclosure as a whole: numerous variations and alternatives to the details provided herein below are possible and should be considered within the scope of the disclosure.

High Speed Train (HST) operation is one possible cellular deployment scenario. In such a scenario, a wireless device that is travelling between two TRPs can observe very high positive Doppler shift from one TRP, and very high negative Doppler shift from the other TRP. As a result, the composite channel can vary quite quickly, for example close to or more than 2 kHz, at least as one possibility. This can potentially reduce the channel capability and challenge the ability of the UE to perform accurate channel estimation.

Multiple single frequency network (SFN) based approaches to providing cellular service in such a scenario are possible. As one possibility, a HST-SFN scheme ("HST-SFN scheme 1") in which a UE can estimate 2 separate Doppler shift values (i.e., one from each TRP) to assist with UE channel estimation can be implemented. As another possibility, a HST SFN scheme ("HST-SFN with pre-compensation") in which the network can determine and pre-compensate for the Doppler shift when communicating with a UE can be implemented.

For both HST-SFN scheme 1 and HST-SFN with pre-compensation, it may be possible for a MAC-CE to be used to configure two TCI states for a control resource set (CORESET). Beam failure recovery may be based on hypothetical PDCCH BLER, and BFR enhancement may be important to improve PDCCH reliability for HST-SFN operation. Accordingly, techniques that can provide beam failure detection resource enhancements, candidate beam detection resource enhancements, and/or beam failure request scheduling request enhancements are described herein, at least according to some embodiments.

As one aspect, for beam failure recovery for HST-SFN operation, independent BFD resource sets (e.g., multiple failureDetectionResourcesToAddModList entries, which may be configured in a RadioLinkMonitoringConfig RRC information element, and which may configure a set of RadioLinkMonitoringRS) can be configured for each TRP in the HST-SFN operation. In some instances, one or more of the following restrictions may be implemented, if desired. As one possible restriction, either both BFD resource sets are explicitly configured, or both are implicitly configured (e.g., not configured directly by RRC signaling). As another possible restriction, it may be the case that BFD resource sets cannot share the same resources; for example, along the entire QCL configuration chain, it may be the case that no resource in the first BFD resource set and no resource in the second BFD resource set directly or indirectly share the same QCL-TypeD source. As a further possible restriction, it may be the case that both BFD resource sets are required to have the same number of resources.

In some instances, for beam failure recovery for HST-SFN operation, when independent BFD resource sets are configured, for HST-SFN PDCCH operation configured by RRC, it may be the case that SSB (e.g., ssb-Index) cannot be configured as RadioLinkMonitoringRS. In other words, in such a scenario, it may be the case that only CSI-RS (e.g., csi-RS-Index) can be configured as RadioLinkMonitoringRS.

In some instances, for beam failure recovery for HST-SFN operation, when independent BFD resource sets are configured, it may be possible to provide techniques for differentiating between multiple different possible HSF-SFN PDCCH schemes (e.g., HSF-SFN scheme 1 or HST-SFN with pre-compensation). As one such possibility, it may be possible that RRC signaling is used to explicitly configure the type of HST-SFN scheme in use for beam failure recovery. As another possibility, the QCL configuration may be used to imply the HSF-SFN scheme in use. For example, to identify HST-SFN scheme 1, it may be the case that resources in both BFD resource sets are configured to be QCL'd to TRS with QCL-TypeA (and QCL-TypeD if applicable, such as in FR2), while to identify HST-SFN with pre-compensation, it may be the case that resources in one BFD resource set are configured to be QCL'd to TRS with QCL-TypeA (and QCL-TypeD if applicable) and the resources in the other BFD resource set are configured to be QCL'd to TRS with {average delay, delay spread} (and QCL-TypeD if applicable).

In some instances, for beam failure recovery for HST-SFN operation, it may be possible that in a given BFD resource set (e.g., failureDetectionResourcesToAddModList), it may be possible that each RadioLinkMonitoringRS can be configured for one or two detectionResource(s). In such a scenario, when one detectionResource is configured, it may be assumed by a wireless device and a cellular network to be for single TRP BFD. When two detectionResources are configured, they may be assumed to be for multi-TRP BFD. Further, to differentiate between different possible HST-SFN PDCCH schemes (e.g., HSF-SFN scheme 1 or HST-SFN with pre-compensation) in such a scenario, it may be possible that for HST-SFN scheme 1, both detectionResources are configured to QCL'd to TRS with QCL-TypeA (and QCL-TypeD if applicable), while for HST-SFN with pre-compensation, one detectionResource is configured to be QCL'd to TRS with QCL-TypeA (and QCL-TypeD if applicable) and the other detectionResource is configured to be QCL'd to TRS with {average delay, delay spread} (and QCL-TypeD if applicable). Note that it may be the case that the network will not configure RadioLinkMonitoringRS with different HST-SFN schemes; in other words, it may be assumed by the network and the UE that HST-SFN scheme 1 for one pair of detectionResource and HST-SFN with pre-compensation for another pair of detectionResource will not be configured, at least according to some embodiments.

It may be possible that the network does not explicitly configure BFD resources for a UE in a HST-SFN communication scheme. In such a scenario, it may be the case that the UE monitors CORESET resources for BFD. As one possibility, it may be left to UE implementation for the UE to determine which CORESET(s) that the UE chooses to monitor for BFD. In such a scenario, all the CORESETs may be considered for the total number of BFD resources that the UE tracks. As another possibility, the UE may select the CORESET(s) based on one or more of certain configured criteria (e.g., subject to a maximum number of BFD resources that the UE can monitor). The criteria could include the monitoring periodicity of the associated search space sets for the configured CORESETs, the CORESET index values for the configured CORESETs, and/or whether each CORESET is configured with one or two TCI states, among various possible criteria.

For beam failure recovery for HST-SFN operation, it may additionally or alternatively be possible that independent CBD resource sets (e.g., multiple candidateBeamRSSCellList entries, which may be configured in a BeamFailureRecoverySCellConfig information element, and which may configure a set of CandidateBeamRS) can be configured for each TRP in the HST-SFN operation. In some instances, one or more of the following restrictions may be implemented, if desired. As one possible restriction, either both CBD resource sets are explicitly configured, or both are implicitly configured (e.g., not configured directly by RRC signaling). As another possible restriction, it may be the case that CBD resource sets cannot share the same resources; for example, along the entire QCL configuration chain, it may be the case that no resource in the first CBD resource set and no resource in the second CBD resource set directly or indirectly share the same QCL-TypeD source. As a further possible restriction, it may be the case that both CBD resource sets are required to have the same number of resources.

In some instances, for beam failure recovery for HST-SFN operation, when independent CBD resource sets are configured, it may be possible to provide techniques for differentiating between multiple different possible HSF-SFN PDCCH schemes (e.g., HSF-SFN scheme 1 or HST-SFN with pre-compensation). As one such possibility, it may be possible that RRC signaling is used to explicitly configure the type of HST-SFN scheme in use for candidate beam detection. As another possibility, the QCL configuration may be used to imply the HSF-SFN scheme in use. For example, to identify HST-SFN scheme 1, it may be the case that resources in both CBD resource sets are configured to QCL'd to TRS with QCL-TypeA (and QCL-TypeD if applicable), while to identify HST-SFN with pre-compensation, it may be the case that resources in one CBD resource set are configured to be QCL'd to TRS with QCL-TypeA (and QCL-TypeD if applicable) and the resources in the other CBD resource set are configured to be QCL'd to TRS with {average delay, delay spread} (and QCL-TypeD if applicable).

In some instances, for beam failure recovery for HST-SFN operation, it may be possible that in a given CBD resource set, each CandidateBeamRS can be configured for one or two resources. In such a scenario, when one resource is configured, it may be assumed by a wireless device and a cellular network to be for single TRP CBD. When two resources are configured, they may be assumed to be for multi-TRP CBD. Further, to differentiate between different possible HST-SFN PDCCH schemes (e.g., HSF-SFN scheme 1 or HST-SFN with pre-compensation) in such a scenario, it may be possible that for HST-SFN scheme 1, both resources are configured to QCL'd to TRS with QCL-TypeA (and QCL-TypeD if applicable), while for HST-SFN with pre-compensation, one resource is configured to be QCL'd to TRS with QCL-TypeA (and QCL-TypeD if applicable) and the other resource is configured to be QCL'd to TRS with {average delay, delay spread} (and QCL-TypeD if applicable). Note that it may be the case that the network will not configure CBD resources with different HST-SFN schemes; in other words, it may be assumed by the network and the UE that HST-SFN scheme 1 for one pair of CBD resources and HST-SFN with pre-compensation for another pair of CBD resources will not be configured.

It may be possible that the network does not explicitly configure CBD resources for a UE in a HST-SFN communication scheme. In such a scenario, it may be the case that the UE considers RACH resources for CBD resources.

In some instances, the number of implicitly or explicitly configured BFD resource sets and CBD resource sets may be expected to match. For example, as one possibility, the following may be considered valid configurations. For single TRP BFR, #BFD resource sets=1, #CBD resource sets=0 or 1. For HSF-SFN BFR, #BFD resource sets=2, #CBD resource sets=0 or 2.

BFR SR configuration can include configuring a SchedulingRequestId for BFR SR per MAC in each cell group (e.g., schedulingRequestID-BFR-SCell). In the SchedulingRequestId, a PUCCH resource may be configured (e.g., PUCCH-ResourceId). A spatial relation (e.g., beam) can be updated for each PUCCH resource via MAC-CE. Such an approach may be used to support BFR SR for HST-SFN operation, if desired.

As another possibility, a similar approach but with a spatial relation configuration enhancement may be used. In such a scenario, a SchedulingRequestId for BFR SR per MAC in each cell group (e.g., schedulingRequestID-BFR-SCell) may be configured. In the SchedulingRequestId, a single PUCCH resource may be configured (e.g., PUCCH-ResourceId). For each PUCCH resource, it may be possible that two spatial relations are configured, e.g., one for each TRP. In such a scenario, when BFR occurs, a UE may transmit on the PUCCH resource with both configured spatial relations. Alternatively, the network may configure an association between each PUCCH spatial relation and each TRP (e.g., using BFD resource set). When beam failure is detected on one BFD resource set, the UE may transmit the PUCCH with the corresponding spatial relation. Note that the spatial relation association configured by the network may cause the UE to transmit using the PUCCH resource to the TRP which is not experiencing beam failure, e.g., to improve the reliability of the transmission, at least according to some embodiments.

As a further possibility, an approach in which multiple PUCCH resources are configured can be used, if desired. In such a scenario, a SchedulingRequestId for BFR SR per MAC in each cell group may be configured. In the SchedulingRequestId, two PUCCH resources may be configured, e.g., one for each TRP. For each PUCCH resource, a single spatial relation may be configured. Note that the spatial relations may differ for the different PUCCH resources. In such a scenario, when BFR occurs, a UE may transmit on both PUCCH resources with the corresponding configured spatial relations. Alternatively, the network may configure associations between PUCCH resources and TRPs (e.g., using BFD resource set). When beam failure is detected on one BFD resource set, the UE may transmit the PUCCH resource associated with the TRP for which the beam failure is detected. Note that the PUCCH resource association configured by the network may cause the UE to transmit the PUCCH resource carrying the BFR SR to the TRP which is not experiencing beam failure, e.g., to improve the reliability of the transmission, at least according to some embodiments.

As a still further possibility, an approach in which multiple SchedulingRequestIds are configured can be used, if desired. In such a scenario, two SchedulingRequestIds for BFR SR per MAC in each cell group may be configured, e.g., one for each TRP. In each SchedulingRequestId, one PUCCH resource may be configured. For each PUCCH resource, a single spatial relation may be configured. Note that the spatial relations may differ for the PUCCH resources for the different SchedulingRequestIds. In such a scenario, when BFR occurs, a UE may transmit both SchedulingRequestIds with the corresponding PUCCH resources and configured spatial relations. Alternatively, the network may configure associations between SchedulingRequestIds and TRPs (e.g., using BFD resource set). When beam failure is detected on one BFD resource set, the UE may transmit the SchedulingRequestId associated with the TRP for which the beam failure is detected. Note that the SchedulingRequestId association configured by the network may cause the UE to transmit the SchedulingRequestId to the TRP which is not experiencing beam failure, e.g., to improve the reliability of the transmission, at least according to some embodiments.

In the following further exemplary embodiments are provided.

One set of embodiments may include a method, comprising: by a wireless device: establishing a cellular link with a cellular network according to a single frequency network scheme; determining one or more beam failure detection (BFD) resources for each of at least a first transmission reception point (TRP) and a second TRP, wherein the first TRP and the second TRP are associated with the cellular link with the cellular network; and detecting beam failure for at least one of the first TRP or the second TRP using the BFD resources.

According to some embodiments, the method further comprises: receiving configuration information indicating BFD resources for each of at least the first TRP and the second TRP, wherein the BFD resources for each of at least the first TRP and the second TRP are determined based on the configuration information.

According to some embodiments, the method further comprises: determining that configuration information indicating BFD resources for the first TRP and the second TRP is not provided to the wireless device, wherein the BFD resources determined for each of at least the first TRP and the second TRP are control resource set (CORESET) resources that are selected based at least in part on one or more of: monitoring periodicity of search space sets associated with each configured CORESET; CORESET index values for each configured CORESET; or whether each configured CORESET is configured with one or two transmission configuration indicator (TCI) states.

According to some embodiments, the method further comprises: determining a type of single frequency network scheme in use for beam failure recovery based on one or more of: configuration information provided to the wireless device via radio resource control signaling; or a quasi-co-location (QCL) configuration for the BFD resources for the first TRP and the second TRP.

According to some embodiments, the method further comprises: determining one or more candidate beam detection (CBD) resources for each of at least the first TRP and the second TRP; and identifying one or more candidate beam for beam failure recovery using the CBD resources for the first TRP and the second TRP.

According to some embodiments, the method further comprises: receiving configuration information indicating CBD resources for each of at least the first TRP and the second TRP, wherein the CBD resources for each of at least the first TRP and the second TRP are determined based on the configuration information.

According to some embodiments, the method further comprises: determining that configuration information indicating CBD resources for the first TRP and the second TRP is not provided to the wireless device, wherein the BFD resources determined for each of at least the first TRP and the second TRP are random access channel (RACH) resources.

According to some embodiments, the method further comprises: determining a type of single frequency network scheme in use for beam failure recovery based on one or more of: configuration information provided to the wireless device via radio resource control signaling; or a quasi-co-location (QCL) configuration for the CBD resources for the first TRP and the second TRP.

According to some embodiments, the method further comprises: selecting, based at least in part on the detected beam failure, one or more beams to use to transmit a beam failure recovery scheduling request, wherein the one or more beams are selected from multiple beams configured for beam failure recovery scheduling request transmissions; and transmitting the beam failure recovery scheduling request using the selected one or more beams.

According to some embodiments, the multiple beams configured for beam failure recovery scheduling request transmissions include at least a beam associated with the first TRP and a beam associated with the second TRP.

According to some embodiments, the one or more beams to use to transmit the beam failure recovery scheduling request are selected based at least in part on whether the detected beam failure is associated with the first TRP, the second TRP, or both the first TRP and the second TRP.

Another set of embodiments may include a wireless device, comprising: one or more processors; and a memory having instructions stored thereon, which when executed by the one or more processors, perform steps of any of the preceding examples.

Yet another set of embodiments may include a method, comprising: by a cellular base station configured to provide at least a first transmission reception point (TRP) in a cellular network: establishing a cellular link with a wireless device according to a single frequency network scheme; and configuring one or more beam failure detection (BFD) resources for the wireless device for each of at least a first transmission reception point (TRP) and a second TRP.

According to some embodiments, the method further comprises: providing an indication to the wireless device of a type of single frequency network scheme in use for beam failure recovery by way of one or more of: configuration information provided to the wireless device via radio resource control signaling; or a quasi-co-location (QCL) configuration for the BFD resources for the first TRP and the second TRP.

According to some embodiments, the one or more BFD resources for each of the first TRP and the second TRP are configured using one of: a BFD resource set for each of the first TRP and the second TRP; or a BFD resource set in which one or more pairs of BFD resources are configured, wherein each pair of BFD resources includes a BFD resource configured for the first TRP and a BFD resource configured for the second TRP.

According to some embodiments, the method further comprises: configuring one or more candidate beam detection (CBD) resources for the wireless device for each of at least the first TRP and the second TRP.

According to some embodiments, the method further comprises: providing an indication to the wireless device of a type of single frequency network scheme in use for beam failure recovery by way of one or more of: configuration information provided to the wireless device via radio resource control signaling; or a quasi-co-location (QCL) configuration for the CBD resources for the first TRP and the second TRP.

According to some embodiments, the one or more CBD resources for each of the first TRP and the second TRP are configured using one of: a CBD resource set for each of the first TRP and the second TRP; or a CBD resource set in which one or more pairs of CBD resources are configured, wherein each pair of CBD resources includes a CBD resource configured for the first TRP and a CBD resource configured for the second TRP.

According to some embodiments, the method further comprises: configuring multiple beams for the wireless device for beam failure recovery scheduling request transmissions.

According to some embodiments, the multiple beams configured for beam failure recovery scheduling request transmissions include at least a beam associated with the first TRP and a beam associated with the second TRP.

Still another set of embodiments may include a cellular base station, comprising: one or more processors; and a memory having instructions stored thereon, which when executed by the one or more processors, perform steps of any of the preceding examples.

A further set of embodiments may include a computer program product, comprising computer instructions which, when executed by one or more processors, perform steps of any of the preceding examples.

A further exemplary embodiment may include a method, comprising: performing, by a device, any or all parts of the preceding examples.

Another exemplary embodiment may include a device, comprising: an antenna; a radio coupled to the antenna; and a processor operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
   receiving radio resource control (RRC) signaling indicating first beam failure detection (BFD) resource set and a second BFD resource set associated with a first transmission reception point (TRP) and a second TRP, respectively;
   receiving a configuration for a first scheduling request ID and a second scheduling request ID associated with the first BFD resource set and the second BFD resource set, respectively;
   detecting beam failure on at least one of the first BFD resource set or the second BFD resource set; and
   transmitting an indication of at least one of the first scheduling request ID or the second scheduling request ID associated with the at least one of the first BFD resource set or the second BFD resource set on which the beam failure is detected.

2. The method of claim 1, wherein the first BFD resource set and the second BFD resource set comprise:
   control resource set (CORESET) resources that are selected based at least in part on one or more of:
      monitoring periodicity of search space sets associated with each configured CORESET;
      CORESET index values for each configured CORESET; or
      whether each configured CORESET is configured with one or two transmission configuration indicator (TCI) states.

3. The method of claim 1, wherein the method further comprises:
   determining a type of single frequency network scheme in use for beam failure recovery based on one or more of:
      configuration information received via radio resource control signaling; or
      a quasi-co-location (QCL) configuration for the first BFD resource set and the second BFD resource set.

4. The method of claim 1, wherein the method further comprises:
   determining one or more candidate beam detection (CBD) resources for each of at least the first TRP and the second TRP; and
   identifying one or more candidate beam for beam failure recovery using the CBD resources for the first TRP and the second TRP.

5. The method of claim 4, wherein the method further comprises:
   receiving configuration information indicating CBD resources for each of at least the first TRP and the second TRP, wherein the CBD resources for each of at least the first TRP and the second TRP are determined based on the configuration information.

6. The method of claim 4, wherein the method further comprises:
   determining that configuration information indicating CBD resources for the first TRP and the second TRP is not provided, wherein the first BFD resource set and the second BFD resource set comprise random access channel (RACH) resources.

7. The method of claim 4, wherein the method further comprises:
   determining a type of single frequency network scheme in use for beam failure recovery based on one or more of:
      configuration information received via radio resource control signaling; or
      a quasi-co-location (QCL) configuration for the CBD resources for the first TRP and the second TRP.

8. The method of claim 1, wherein a first physical uplink control channel (PUCCH) resource is configured to provide the indication of the first scheduling request ID, and a second PUCCH resource is configured to provide the indication of the second scheduling request ID.

9. The method of claim 1, wherein the method further comprises:
   receiving RRC signaling indicating a first candidate beam detection resources (CBD) set and a second CBD resource set associated with the first TRP and the second TRP, respectively.

10. An apparatus, comprising:
    a processor configured to, when executing instructions stored in a memory, perform operations comprising:
       receiving radio resource control (RRC) signaling indicating a first beam failure detection (BFD) resource set and a second BFD resource set associated with a first transmission reception point (TRP) and a second TRP, respectively;
       receiving a configuration for a first scheduling request ID and a second scheduling request ID associated with the first BFD resource set and the second BFD resource set, respectively;
       detecting beam failure on at least one of the first BFD resource set or the second BFD resource set; and
       transmitting an indication of at least one of the first scheduling request ID or the second scheduling request ID associated with the at least one of the first BFD resource set or the second BFD resource set on which the beam failure is detected.

11. The apparatus of claim 10, wherein the first BFD resource set and the second BFD resource set comprise control resource set (CORESET) resources that are selected based at least in part on one or more of:
monitoring periodicity of search space sets associated with each configured CORESET;
CORESET index values for each configured CORESET; or
whether each configured CORESET is configured with one or two transmission configuration indicator (TCI) states.

12. The apparatus of claim 10, the operations further comprising:
determining a type of single frequency network scheme in use for beam failure recovery based on one or more of:
configuration information received via radio resource control signaling; or
a quasi-co-location (QCL) configuration for the first BFD resource set and the second BFD resource set.

13. The apparatus of claim 10, the operations further comprising:
determining one or more candidate beam detection (CBD) resources for each of at least the first TRP and the second TRP; and
identifying one or more candidate beam for beam failure recovery using the CBD resources for the first TRP and the second TRP.

14. The apparatus of claim 13, the operations further comprising:
receiving configuration information indicating CBD resources for each of at least the first TRP and the second TRP, wherein the CBD resources for each of at least the first TRP and the second TRP are determined based on the configuration information.

15. The apparatus of claim 13, the operations further comprising:
determining that configuration information indicating CBD resources for the first TRP and the second TRP is not provided, wherein first BFD resource set and the second BFD resource set comprise random access channel (RACH) resources.

16. The apparatus of claim 10, wherein a first physical uplink control channel (PUCCH) resource is configured to provide the indication of the first scheduling request ID, and a second PUCCH resource is configured to provide the indication of the second scheduling request ID.

17. The apparatus of claim 10, the operations further comprising:
receiving RRC signaling indicating a first candidate beam detection resources (CBD) set and a second CBD resource set associated with the first TRP and the second TRP, respectively.

18. A method, comprising:
transmitting radio resource control (RRC) signaling indicating a first beam failure detection (BFD) resource set and a second BFD resource set associated with a first transmission reception point (TRP) and a second TRP, respectively;
transmitting a configuration for a first scheduling request ID and a second scheduling request ID associated with the first BFD resource set and the second BFD resource set, respectively; and
receiving an indication of at least one of the first scheduling request ID or the second scheduling request ID associated with the at least one of the first BFD resource set or the second BFD resource set on which a beam failure is detected.

19. The method of claim 18, wherein a first physical uplink control channel (PUCCH) resource is configured to provide the indication of the first scheduling request ID, and a second PUCCH resource is configured to provide the indication of the second scheduling request ID.

20. The method of claim 18, further comprising:
receiving RRC signaling indicating a first candidate beam detection resources (CBD) set and a second CBD resource set associated with the first TRP and the second TRP, respectively.

* * * * *